US012457664B2

(12) United States Patent
Schliwa-Bertling et al.

(10) Patent No.: US 12,457,664 B2
(45) Date of Patent: Oct. 28, 2025

(54) USER EQUIPMENT, NETWORK NODE AND METHODS THEREIN

(71) Applicant: Telefonaktiebolaget LM Ericsson (publ), Stockholm (SE)

(72) Inventors: Paul Schliwa-Bertling, Ljungsbro (SE); Alexander Vesely, Feldbach (AT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 286 days.

(21) Appl. No.: 18/258,073

(22) PCT Filed: Jan. 14, 2022

(86) PCT No.: PCT/EP2022/050724
§ 371 (c)(1),
(2) Date: Jun. 16, 2023

(87) PCT Pub. No.: WO2022/152833
PCT Pub. Date: Jul. 21, 2022

(65) Prior Publication Data
US 2024/0107629 A1 Mar. 28, 2024

Related U.S. Application Data

(60) Provisional application No. 63/137,532, filed on Jan. 14, 2021.

(51) Int. Cl.
*H04W 76/40* (2018.01)
*H04W 68/02* (2009.01)
(Continued)

(52) U.S. Cl.
CPC .......... *H04W 76/40* (2018.02); *H04W 68/02* (2013.01); *H04W 76/10* (2018.02); *H04W 76/20* (2018.02)

(58) Field of Classification Search
CPC ..... H04W 76/40; H04W 68/02; H04W 76/10; H04W 76/20; H04W 76/27; H04W 4/08; H04W 72/231
See application file for complete search history.

(56) References Cited

U.S. PATENT DOCUMENTS

| 11,832,277 | B2 * | 11/2023 | Byun | H04W 76/40 |
| 2023/0082017 | A1 * | 3/2023 | Hong | H04W 76/22 370/312 |
| 2023/0284182 | A1 * | 9/2023 | Shi | H04W 72/232 370/329 |

OTHER PUBLICATIONS

3GPP TR 23.757 (v1.1), "3rd Generation Partnership Project; Technical Specification Group Services and System Aspects; Study on architectural enhancements for 5G multicast-broadcast services" (Year: 2020).*

(Continued)

*Primary Examiner* — Andrew W Chriss
(74) *Attorney, Agent, or Firm* — Murphy, Bilak & Homiller, PLLC (57) ABSTRACT

A method performed by a User Equipment, UE, is provided. The UE receives (s302) a first message comprising a group identifier, ID, allocated for a particular multicast-broadcast services, MBS, session. While camping on radio access network, RAN, node that does not support MBS services and while being in a radio resource control, RRC, state other than RRC_CONNECTED, the UE receives (s304) from the RAN node a paging message. The UE determines (s306) whether the paging message comprises the group ID.

16 Claims, 7 Drawing Sheets (51) Int. Cl.
H04W 76/10 (2018.01)
H04W 76/20 (2018.01)

(56) References Cited

OTHER PUBLICATIONS

"KI#7, Sol#24: Multiple updates to solution", 3GPP TSG-SA2 Meeting #141E, S2-2008104, Elbonia,, Oct. 12-23, 2020, pp. 1-11.
"Solution 2 EN clarifications", SA WG2 Meeting #S2-141E, S2-2007934, (revision of S2-2007282r01), Elbonia, Oct. 12-23, 2020, pp. 1-36.
"[TP for BL CR TS 38.300] TP on Session Management for NR MBS", 3GPP TSG-RAN WG3 Meeting #111-e, R3-210640, Online, Jan. 25-Feb. 4, 2021, pp. 1-3.
"[TP for BL CR TS 38.410] TP on Session Management for NR MBS", 3GPP TSG-RAN WG3 Meeting #111-e, R3-210641, Online, Jan. 25-Feb. 4, 2021, pp. 1-2.
"[TP for BL CR TS 38.413] TP on Session Management for NR MBS", 3GPP TSG-RAN WG3 Meeting #111-e, R3-210642, Online, Jan. 25-Feb. 4, 2021, pp. 1-25.
"3GPP TR 23.757 V1.1.0", 3rd Generation Partnership Project; Technical Specification Group Services and System Aspects; Study on architectural enhancements for 5G multicast-broadcast services (Release 17), Oct. 2020, pp. 1-274.

"3GPP TS 23.501 V17.0.0", 3rd Generation Partnership Project; Technical Specification Group Services and System Aspects; System architecture for the 5G System (5GS); Stage 2, (Release 17), Mar. 2021, pp. 1-489.
"3GPP TS 38.410 V16.4.0", 3rd Generation Partnership Project; Technical Specification Group Radio Access Network; NG-RAN; NG general aspects and principles (Release 16), Oct. 2021, pp. 1-17.
"3GPP TS 38.413 V16.7.0", 3rd Generation Partnership Project; Technical Specification Group Radio Access Network; NG-RAN; NG Application Protocol (NGAP) (Release 16), Oct. 2021, pp. 1-474.
"3GPP TS 38.331 V16.4.1", 3rd Generation Partnership Project; Technical Specification Group Radio Access Network; NR; Radio Resource Control (RRC) protocol specification (Release 16), Mar. 2021, pp. 1-949.
"KI #1, Sol #2: Solution 2 update", SA WG2 Meeting #139E, S2-2003679 (Revision of S2-200xxxx), Electronic, Jun. 1-12, 2020, pp. 1-12.
"3GPP TS 38.300 V16.6.0", 3rd Generation Partnership Project; Technical Specification Group Radio Access Network; NR; NR and NG-RAN Overall Description; Stage 2 (Release 16), Jun. 2021, pp. 1-152.
"MBS reception in Idle and Inactive mode", 3GPP TSG-RAN2 Meeting #112-e, R2-2009953, eMeeting, Nov. 2-13, 2020, pp. 1-9.

* cited by examiner

USER EQUIPMENT, NETWORK NODE AND METHODS THEREIN

TECHNICAL FIELD

This disclosure relates to Multicast Broadcast Services (MBS). Embodiments herein relate to a User Equipment (UE), a network node and methods performed therein.

BACKGROUND

The 3rd Generation Partnership Project (3GPP) is currently working on introducing support for 5G MBS (5MBS).

In a typical wireless communication network, wireless devices, also known as wireless communication devices, mobile stations, stations (STA) and/or UEs, communicate via a Wide Area Network or a Local Area Network such as a Wi-Fi network or a cellular network comprising a Radio Access Network (RAN) part and a Core Network (CN) part. The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in Fifth Generation (5G) telecommunications. A service area or cell area is a geographical area where radio coverage is provided by the radio network node. The radio network node communicates over an air interface operating on radio frequencies with the wireless device within range of the radio network node.

3GPP is the standardization body for specify the standards for the cellular system evolution, e.g., including 3G, 4G, 5G and the future evolutions. Specifications for the Evolved Packet System (EPS), also called a Fourth Generation (4G) network, have been completed within the 3rd Generation Partnership Project (3GPP). As a continued network evolution, the new releases of 3GPP specifies a 5G network also referred to as 5G New Radio (NR).

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

SUMMARY

Certain challenges presently exist. For instance, a scalability aspect appears if MBS Session resources, e.g., Packet Data Unit (PDU) Session resources, at a non-MBS supporting 5G base station, denoted "gNB", have to be established for UEs that are currently not in the RRC_CONNECTED state. Also, if the registration area of UEs spans supporting and non-supporting gNBs, then the effort in terms of paging resources is evident—especially for large Multicast (MC) groups.

Accordingly, in one aspect, there is provided a method performed by a UE. The method comprises receiving a first message comprising a group identifier (ID) allocated for a particular MBS session. The method further comprises while camping on RAN node that does not support MBS services and while being in a radio resource control (RRC) state other than RRC_CONNECTED, receiving from the RAN node a paging message. The method further comprises determining whether the paging message comprises the group ID.

In another aspect, there is provided a computer program comprising instructions which when executed by processing circuitry of a UE, causes the UE to perform the above discussed method.

In another aspect, there is provided a UE. The UE is configured to receive a first message, comprising a group ID allocated for the particular MBS session. The message may e.g. be a non-access stratum (NAS) message. E.g., when the UE joins MBS session the UE sends a "join message" e.g., PDU Session Modification Request to Access and Mobility Management Function (AMF), and the UE may then receive the response to the sent message. The UE is further configured to, while camping on RAN node that does not support MBS services and while being in a RRC state other than RRC_CONNECTED, receive from the RAN node a paging message. The UE is further configured determine whether the paging message comprises the group ID.

In another aspect, there is provided a method performed by a network node implementing a core network function, e.g., a Multicast Broadcast (MB) Session Management Function (SMF), an AMF, a Session Management Function (SMF). The method comprises allocating a group ID for a particular MBS session and transmitting toward a UE a message comprising the group ID.

In another aspect, there is provided a method performed by a network node implementing a core network function, e.g., an MB-SMF, an AMF, an SMF. The method comprises transmitting to an AMF a session start request message indicating a group ID allocated for a particular MBS session.

In another aspect, there is provided a computer program comprising instructions which when executed by processing circuitry of a network node, causes the network node to perform the above discussed method.

In another aspect, there is provided a network node. The network node is configured to allocate a group ID for a particular MBS session and transmit toward the UE a message comprising the group ID.

In another aspect, there is provided a network node. The network node is configured to transmit to an AMF a session start request message indicating a group ID allocated for a particular MBS session.

An advantage of the embodiments is that they provide a scalable paging solution for MBS in non-MBS supporting RAN, e.g., NG-RAN, since the UE is required to monitor for paging occasions and to react on paging for a group ID provided to the UE. The group ID is allocated by a core network function for the MBS session. The UE determines whether a received paging message comprises the group ID.

BRIEF DESCRIPTION OF THE DRAWINGS

The accompanying drawings, which are incorporated herein and form part of the specification, illustrate various embodiments.

DETAILED DESCRIPTION

Figure 1:
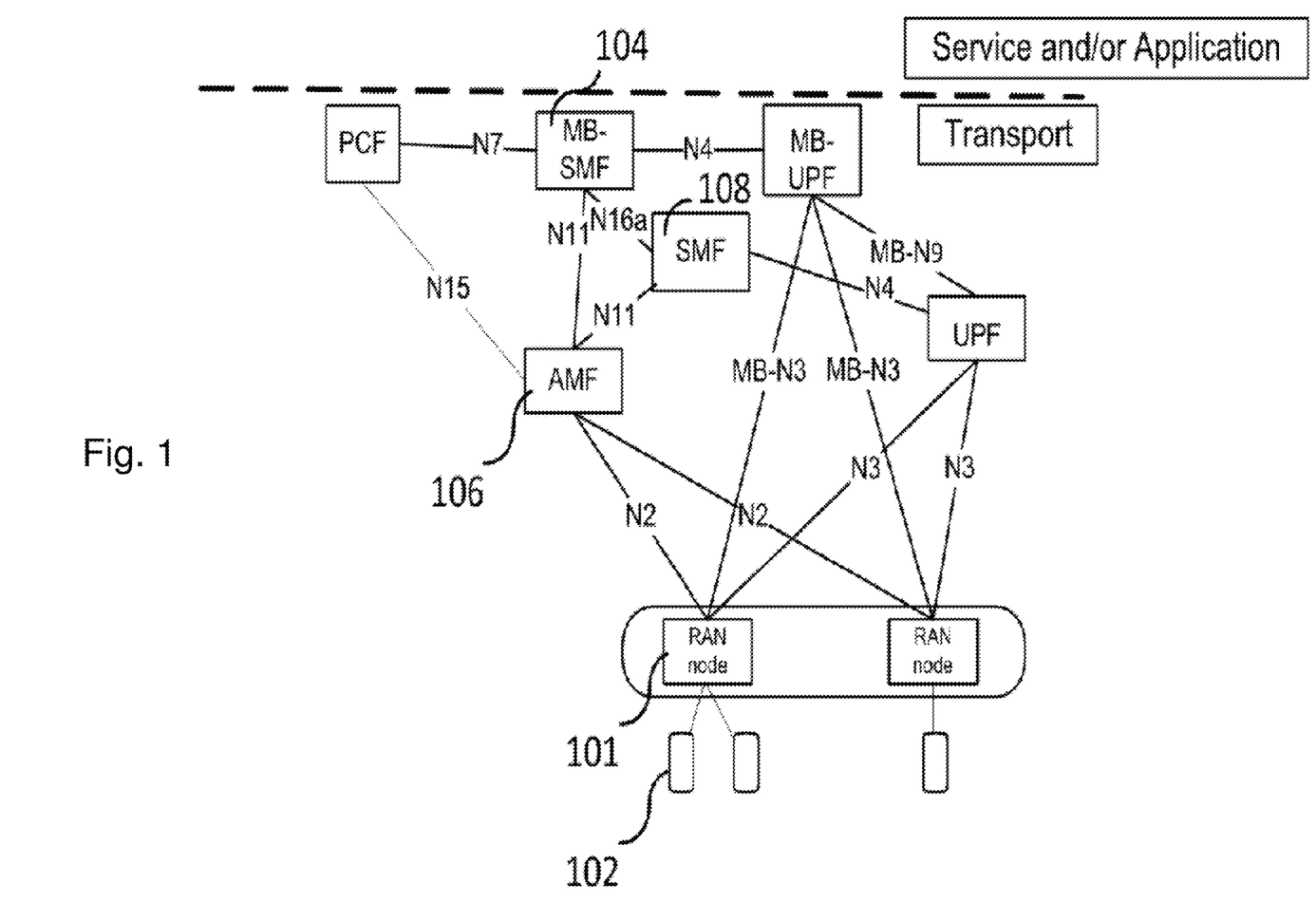
FIG. 1 illustrates a system according to an embodiment.

FIG. 1 illustrates a system 100 according to an embodiment. When a UE, e.g., a UE 102, moves from a RAN node that supports 5MBS to a RAN node that does not support 5MBS, the network and the UE 102 shall support switch from 5GC Shared MBS traffic delivery method to 5GC Individual MBS traffic delivery method, e.g., unicast delivery. As noted above, however, a scalability aspect appears if MBS Session resources, e.g., PDU Session resources, at a non-MBS gNB have to be established for UEs that are currently not in the RRC_CONNECTED state. Also, if the registration area of UEs spans supporting and non-supporting gNBs, then the effort in terms of paging resources is evident—especially for large MC groups.

Accordingly, in one embodiment, this disclosure provides that the UE 102 is required to monitor for paging occasions and react on paging for a group ID, e.g., "group 5G-S-Temporary Mobile Subscriber Identity (TMSI)", allocated by a core network function, e.g., an MB-SMF 104, an AMF 106, an SMF 108, for the MBS session and provided via NAS to the UE at MBS Session joining procedure.

Figure 2A:
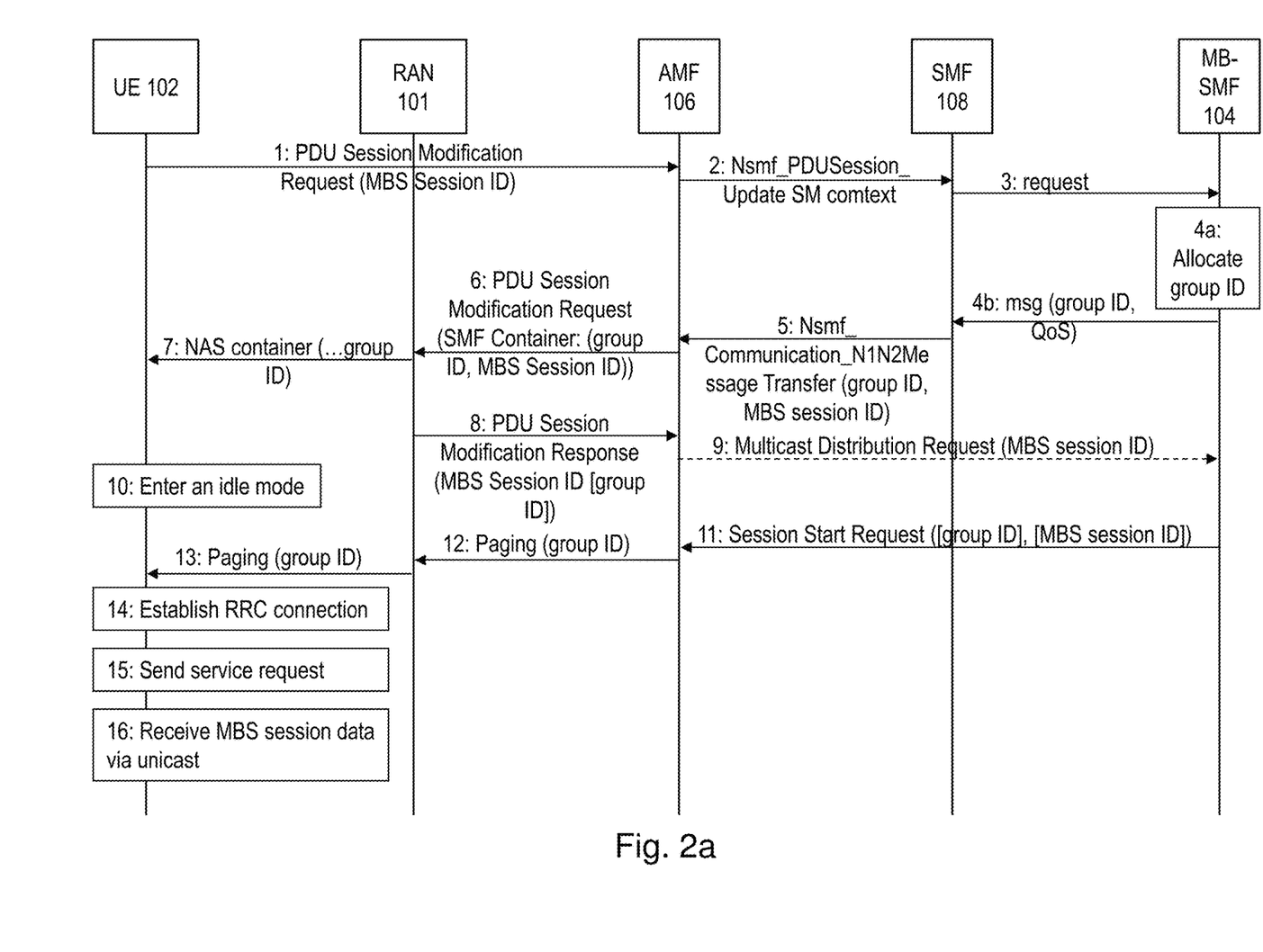
FIG. 2a is a message flow diagram according to an embodiment.

FIG. 2a is a message flow diagram illustrating a process according to an embodiment, which is described below.

1. The UE 102 transmits a message for joining an MBS session identified by an MBS session ID. For example, the UE 102 may transmit a PDU Session Modification Request to its serving AMF 106 comprising the MBS session ID. At this point it is assumed the MBS session is inactive.
2. The AMF 106 sends a message to the SMF 108, e.g., Nsmf_PDUSession Update SM context.
3. The SMF 108 sends a request message to the MB-SMF 104 serving the MBS session identified by the MBS session ID.
4a. The MB-SMF 104 allocates a group ID for the MBS session identified by the MBS session ID. The group ID may be a group 5G-S-TMSI.
4b. The MB-SMF 104 may transmit to the SMF 108 a message comprising the group ID. This message may also comprise Quality-of-Service (QoS) information for the MBS session.
5. The SMF 108 transmits to the AMF 106 a message, e.g., Nsmf_Communication_N1N2Message Transfer, that comprises the group ID.
6. The AMF 106 may transmit to a RAN node 101, e.g., a gNB, a message, e.g., a PDU Session Modification Request comprising a NAS container, e.g. an SMF container, that comprises the group ID.
7. The RAN node 101 may transmit to the UE 102 a message comprising a NAS container, e.g., the SMF NAS container, comprising the group ID. The UE 102 is configured to listen to the paging occasions with that group ID.
8. The RAN node 101 may transmit to the AMF 106 a message, e.g., PDU Session Modification Response, that includes the MBS session ID. The message may also contain the group ID. In this way, the serving AMF 106 holds UE context for the UE 102 and is aware of the MBS sessions the UE 102 has joined. That is, the AMF 106 is aware that UE 102 has joined the MBS session identified by the MBS session ID included in the message from the RAN node 101.
9. If necessary, the AMF 106 transmits to MB-SMF 104 a message, e.g., Multicast Distribution Request, comprising the MBS session ID. This message is for informing the MB-SMF 104 that the AMF 106 is serving a UE that has joined the MBS session so that the MB-SMF 104 will know that it will need to send a session start request to the AMF 106 when the MBS session identified by the MBS session ID is started.
10. The UE 102 moves into an idle state.
11. Due, for example, to a trigger from an application layer, the MBS Session starts, and the MB-SMF 104 sends to the AMF 106 a message informing the AMF 106 about the session start and indicating the group ID. For example, the message may include the group ID and/or the MBS session ID to which the group ID is allocated. The message may also contain among items QoS information for the QoS flows associated with the MBS Session.
12 and 13. In this scenario, the AMF 106 is aware that the UE 102 has joined the starting MBS Session and that the UE 102 is an idle state, e.g., CM-IDLE. Accordingly, the AMF 106 triggers the RAN node 101 to transmit a page with the group ID, e.g., Group-5G-S-TMSI, associated to the MBS Session. The UE 102 has been configured to listen to the paging occasions with that group ID.
14. The UE 102, in response to receiving the page and determining that the page comprises the group ID, the UE 102 moves to the connected state. For example, the UE 102 performs the conventional random access procedure to establish an RRC connection with the RAN node 101.
15. After establishing the connection with the RAN node 101, the UE 102 may transmit to the core network a service request.
16. Thereafter, the UE 102 may start receiving MBS data for the MBS session via a unicast transmission from the RAN node 101.

In the example described above, the MB-SMF 104 allocates the group ID associated with the MBS Session and this group ID is sent to the UE 102 in NAS during joining. The UE 102 may use the group ID to monitor for paging occasions and react on paging for the group ID when camping on a non-MBS supporting NG-RAN, e.g., RAN node 101, after it joined an MBS Session. MBS supporting RAN nodes may use this group ID as well. In another embodiments, the group ID can be allocated by the SMF 108 or the AMF 106. To avoid collisions due to re-use of same 5G-S-TMSI for different UEs or MBS Sessions, the involved entities can be configured with 5G-S-TMSI ranges being reserved.

The AMF 106 may also forward the MBS Session Start information to the MBS supporting RAN nodes within the MBS Session Setup Request message to allocated shared MBS resources. UEs in the MBS Supporting RAN in RRC_INACTIVE are paged via RAN paging with the same group ID, e.g., Group-5G-S-TMSI or another associated paging identifier. When the UEs of the multicast group are in RRC_CONNECTED they are configured with the shared MBS resources.

Figure 2B:
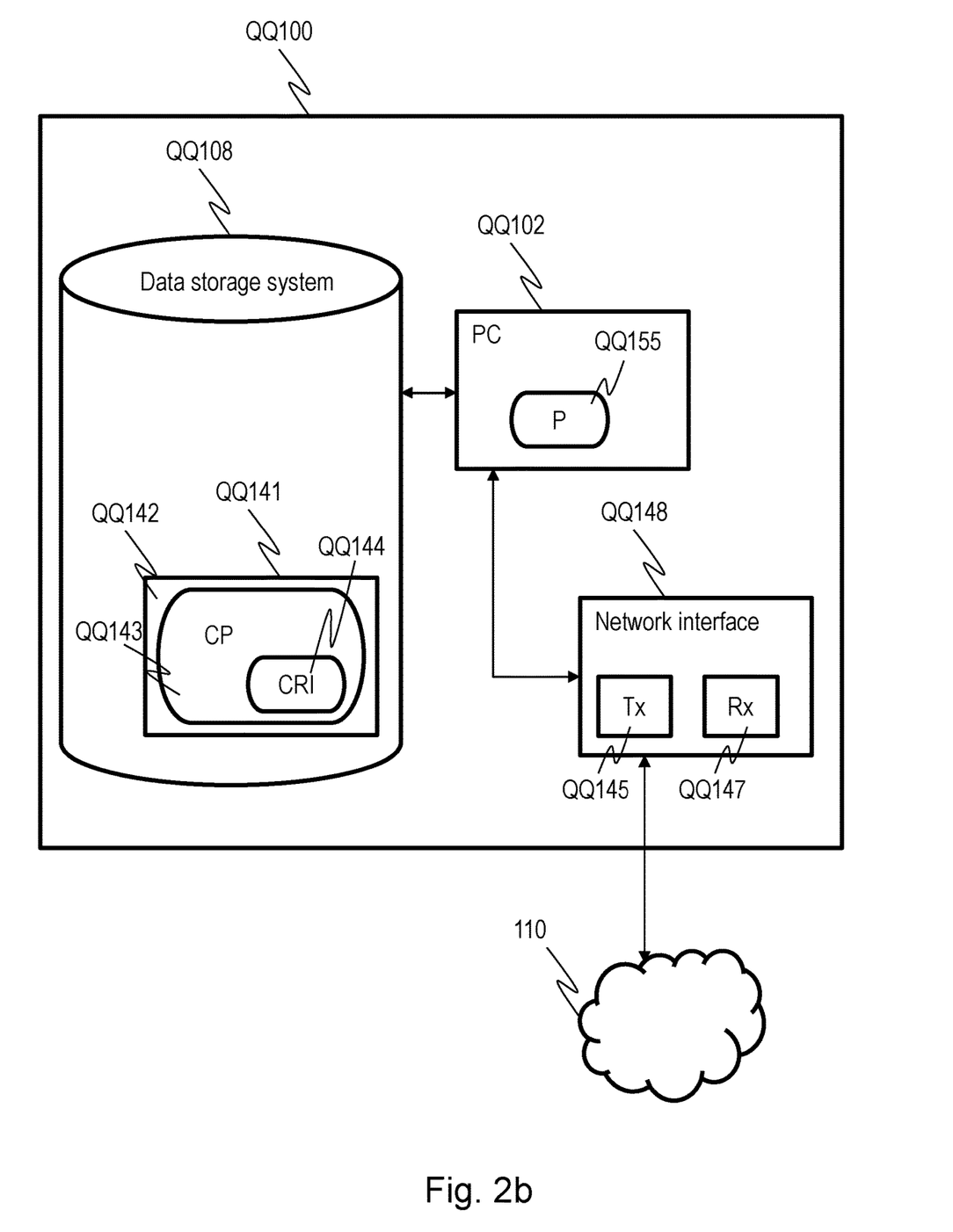
FIG. 2b is a block diagram of a network node according to an embodiment.

FIG. 2b is a block diagram of a network node QQ100, according to some embodiments, that can be used to implement any one of the core network functions described herein, e.g., MB-SMF 104, AMF 106, SMF 108. As shown in FIG. 2b, network node Q100 may comprise: processing circuitry (PC) QQ102, which may include one or more processors (P) QQ155, e.g., one or more general purpose microprocessors and/or one or more other processors, such as an application specific integrated circuit (ASIC), field-programmable gate arrays (FPGAs), and the like, which processors may be co-located in a single housing or in a single data center or may be geographically distributed, i.e., network node QQ100 may be a distributed computing apparatus; at least one network interface QQ148, e.g., a physical interface or air interface, comprising a transmitter (Tx) QQ145 and a receiver (Rx) QQ147 for enabling network node QQ100 to transmit data to and receive data from other nodes connected to a network 110, e.g., an Internet Protocol (IP) network, to which network interface QQ148 is connected, physically or wirelessly, e.g., network interface QQ148 may be coupled to an antenna arrangement comprising one or more antennas for enabling network node Q100 to wirelessly transmit/receive data; and a local storage unit, a.k.a., "data storage system", QQ108, which may include one or more non-volatile storage devices and/or one or more volatile storage devices. In embodiments where PC QQ102 includes a programmable processor, a computer program product (CPP) QQ141 may be provided. CPP QQ141 includes a computer readable medium (CRM) QQ142 storing a computer program (CP) QQ143 comprising computer readable instructions (CRI) QQ144. CRM QQ142 may be a non-transitory computer readable medium, such as, magnetic media, e.g., a hard disk, optical media, memory devices, e.g., random access memory, flash memory, and the like. In some embodiments, the CRI QQ144 of computer program QQ143 is configured such that when executed by PC QQ102, the CRI causes the network node Q100 to perform steps described herein, e.g., steps described herein with reference to the flow charts. In other embodiments, the network node QQ100 may be configured to perform steps described herein without the need for code. That is, for example, the PC QQ102 may consist merely of one or more ASICs. Hence, the features of the embodiments described herein may be implemented in hardware and/or software.

Figure 2C:
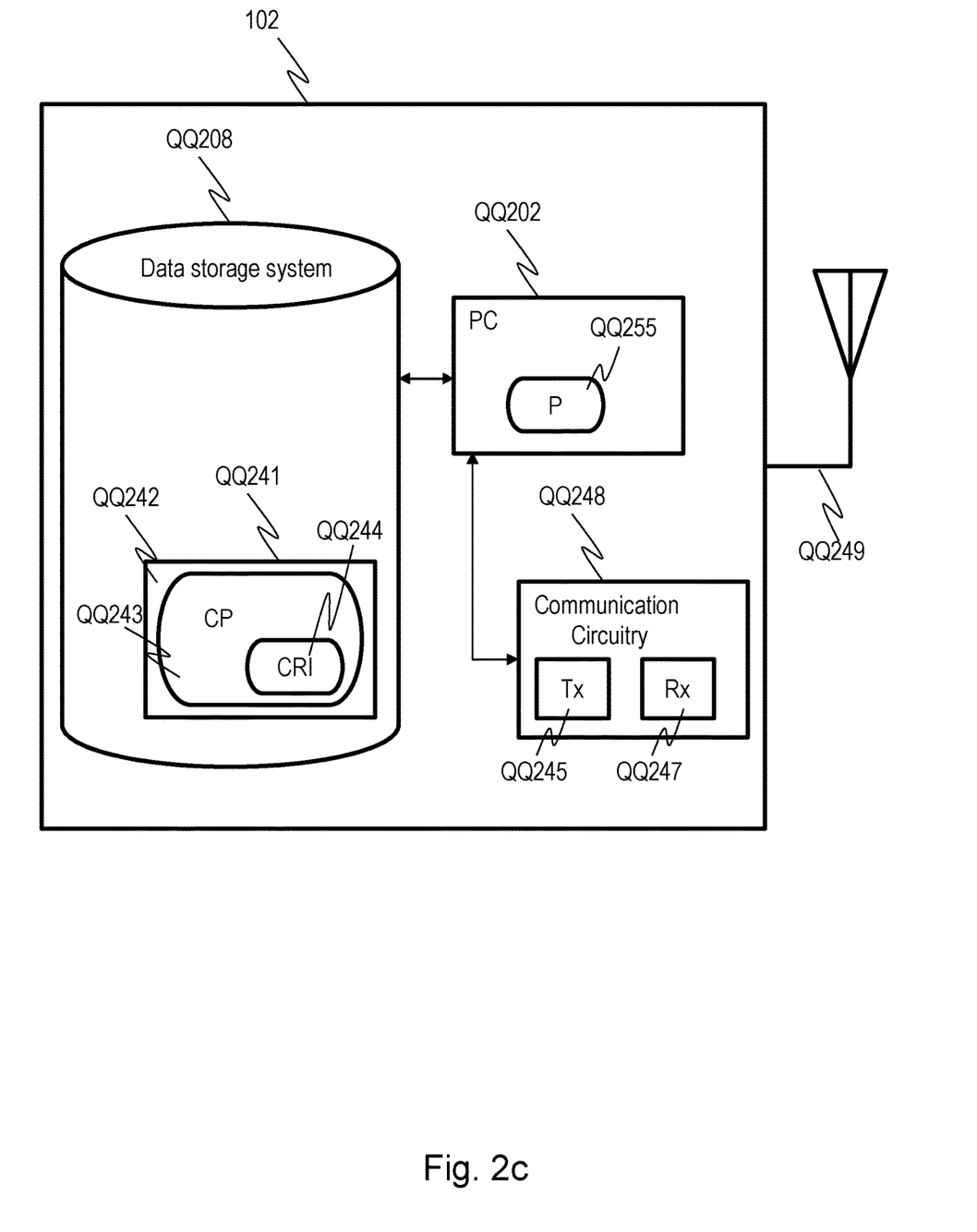
FIG. 2c is a block diagram of a UE according to an embodiment.

FIG. 2b is a block diagram of the UE 102, according to some embodiments. As shown in FIG. 2b, the UE 102 may comprise: a PC QQ202, which may include one or more P QQ255, e.g., one or more general purpose microprocessors and/or one or more other processors, such as an ASIC, FPGAs, and the like; communication circuitry QQ248, which is coupled to an antenna arrangement QQ249 comprising one or more antennas and which comprises a Tx QQ245 and a Rx QQ247 for enabling the UE 102 to transmit data and receive data, e.g., wirelessly transmit/receive data; and a local storage unit, a.k.a., "data storage system" QQ208, which may include one or more non-volatile storage devices and/or one or more volatile storage devices. In embodiments where the PC QQ202 includes a programmable processor, a CPP QQ241 may be provided. The CPP QQ241 includes a CRM QQ242 storing a CP QQ243 comprising CRI QQ244. The CRM QQ242 may be a non-transitory computer readable medium, such as, magnetic media, e.g., a hard disk, optical media, memory devices, e.g., random access memory, flash memory, and the like. In some embodiments, the CRI QQ244 of the computer program QQ243 is configured such that when executed by the PC QQ202, the CRI causes the UE 102 to perform actions described herein, e.g., actions described herein with reference to the flow charts. In other embodiments, the UE 102 may be configured to perform actions described herein without the need for code. That is, for example, the PC QQ202 may consist merely of one or more ASICs. Hence, the features of the embodiments described herein may be implemented in hardware and/or software.

Figure 3:
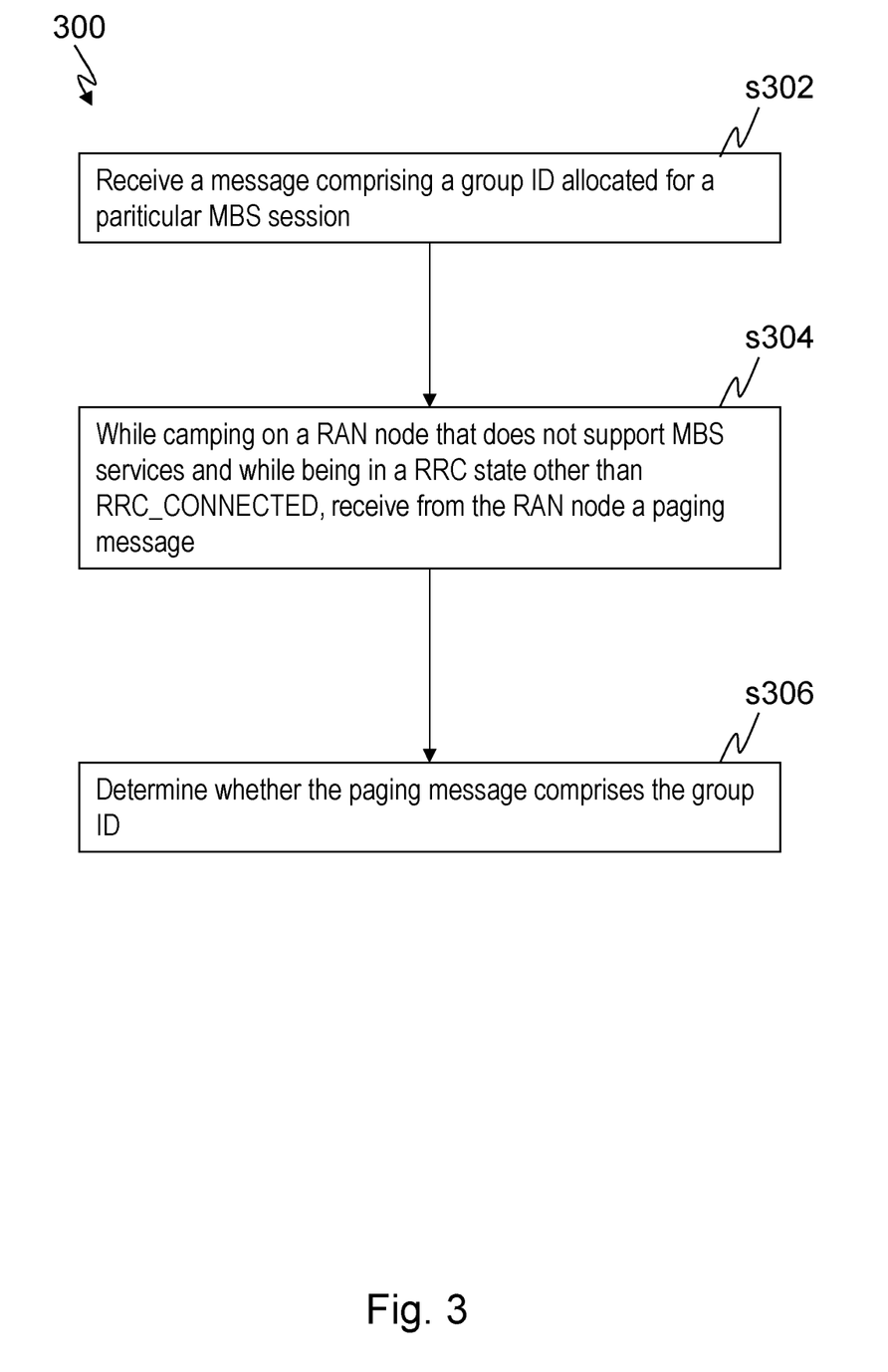
FIG. 3 is a flowchart illustrating a process according to an embodiment.

A method according to embodiments herein will now be described from the view of the UE 102 together with FIG. 3.

Example embodiments of a method performed by the UE 102, will now be described with reference to a flowchart depicted in FIG. 3. The method comprises the following actions which may be taken in any suitable order.

Action s302. The UE 102 receives a first message comprising the group ID allocated for a particular MBS session. The first message may e.g. be a NAS message and/or comprising a NAS container, such as e.g. an SMF NAS container. The group ID may be comprised in the NAS container. The MBS session may be identified by the MBS session ID. The group ID may be a group 5G-S-TMSI. The UE 102 may be configured to listen to the paging occasions with the group ID. For example, the UE 102 sends a "join message" when joining an MBS session, then the UE 102 receives a response, such as e.g. the first message, to the message. In other words, the message may be response to message sent by the UE 102 when joining the MBS session. The "join message" may e.g. be PDU Session Modification Request message sent to an AMF, such as the AMF 106. In some embodiments, prior to receiving the first message, the UE 102 transmits a request to join the MBS session. This may be the "join message" mentioned above. The request may comprise the MBS session ID identifying the MDS session.

Action s304. While camping on a RAN node, such as e.g. the RAN node 101, that does not support MBS services and while being in a RRC state other than RRC_CONNECTED, the UE 102 receives a paging message from the RAN node, e.g. the RAN node 101. In some embodiments, the paging message comprises the group ID. The AMF 106 may trigger RAN node 101 to transmit the page with the group ID, which e.g. may be a Group-5G-S-TMSI, associated to the MBS Session. The UE may have been configured to listen to the paging occasions with that group ID.

Action s306. The UE 102 determines whether the paging message comprises the group ID. In some embodiments, in response to determining that the paging message comprises the group ID, the UE 102 establishes a connection with the RAN node 101. This may mean that the UE 102 moves to a connected state. E.g. the UE 102 performs the conventional legacy random access procedure and sends a service request comprising the MBS identifier, such as e.g. the MBS Session ID, to the network. After establishing the connection with the RAN node 101, the UE 102 may receive data for the MBS session via a unicast transmission from the RAN node 101. The data for the MBS session may be MBS data.

The UE 102 may comprise processing circuitry and a memory containing instructions executable by the processing circuitry. The UE may be configured to perform the above discussed method.

Figure 4A:
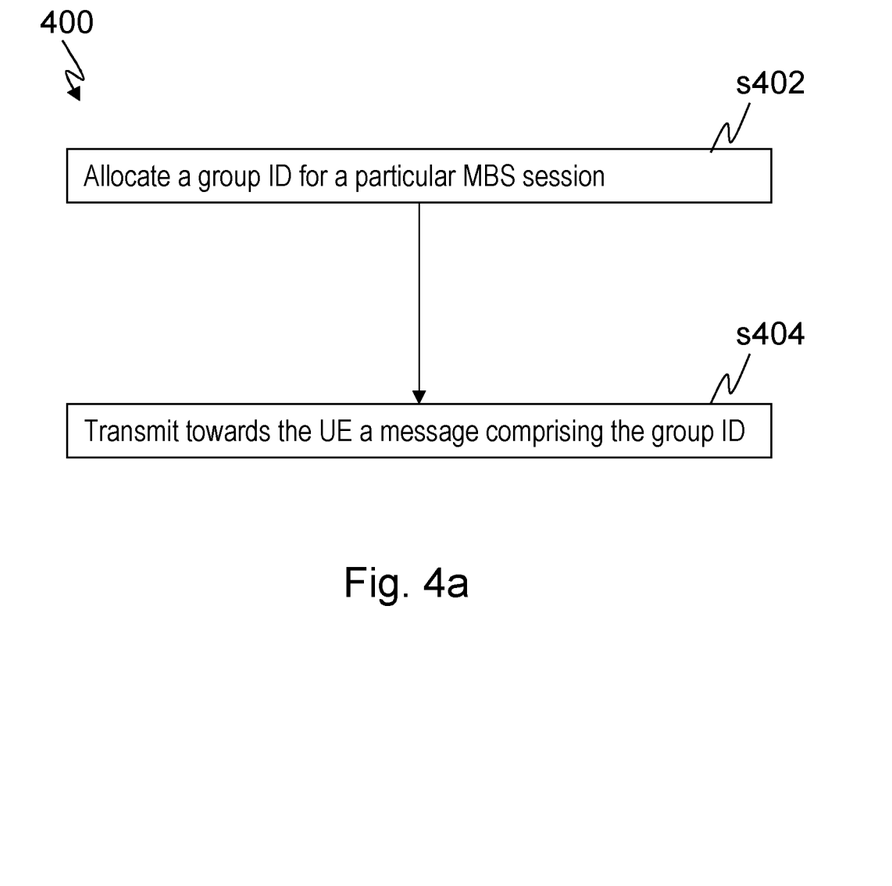
FIG. 4a is a flowchart illustrating a process according to an embodiment.

A method according to embodiments herein will now be described from the view of the network node QQ100 together with FIG. 4a.

Example embodiments of a method performed by the network node QQ100 implementing a core network function, will now be described with reference to a flowchart depicted in FIG. 4a. The network node QQ100 may e.g., be any one out of: The MB-SMF 104, AMF 106 or SMF 108. The method comprises the following actions which may be taken in any suitable order.

Action s402. The network node QQ100 allocates the group ID for a particular MBS session. The group ID may be a group 5G-S-TMSI.

Action s404. The network node QQ100 transmits a message comprising the group ID toward the UE 102. The message may e.g. be the first message referred to above. In some embodiments, transmitting the message toward the UE 102 comprises transmitting the message to an SMF, e.g. the SMF 108. In some embodiments, the network node QQ100 transmits a session start request message indicating the group ID to an AMF, e.g. the AMF 106. The start request message may e.g., comprise the group ID and/or the MBS session ID. The message may also contain among items QoS information for the QoS flows associated with the MBS Session. The session start request message may trigger the AMF, e.g. the AMF 106, to initiate a paging procedure if the AMF is serving a UE that has joined the MBS session and that is in a non-connected state. Initiating the paging procedure may comprise triggering the RAN node 101 to transmit a page with the group ID, such as e.g., Group-5G-S-TMSI, associated to the MBS Session.

The network node QQ100 may comprise processing circuitry; and a memory. The memory may contain instructions executable by the processing circuitry, whereby the network node QQ100 is configured to perform the above discussed method.

Figure 4B:
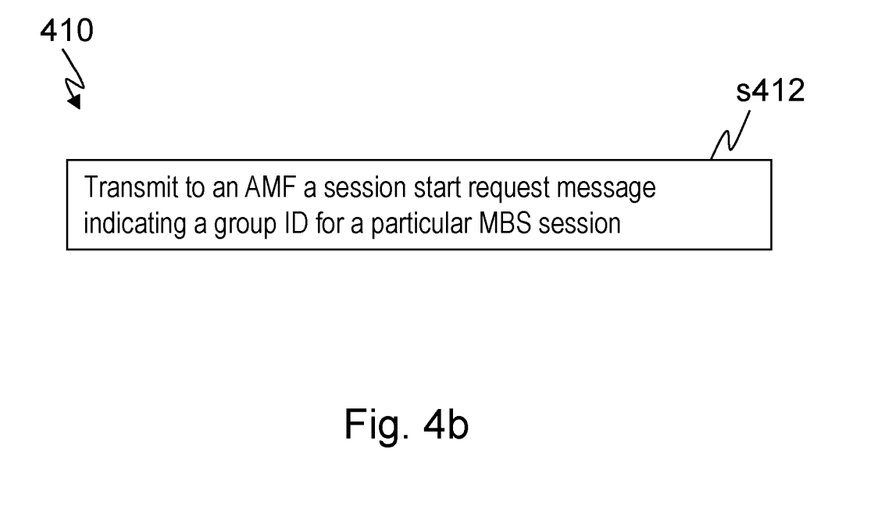
FIG. 4b is a flowchart illustrating a process according to an embodiment.
Figure 5:
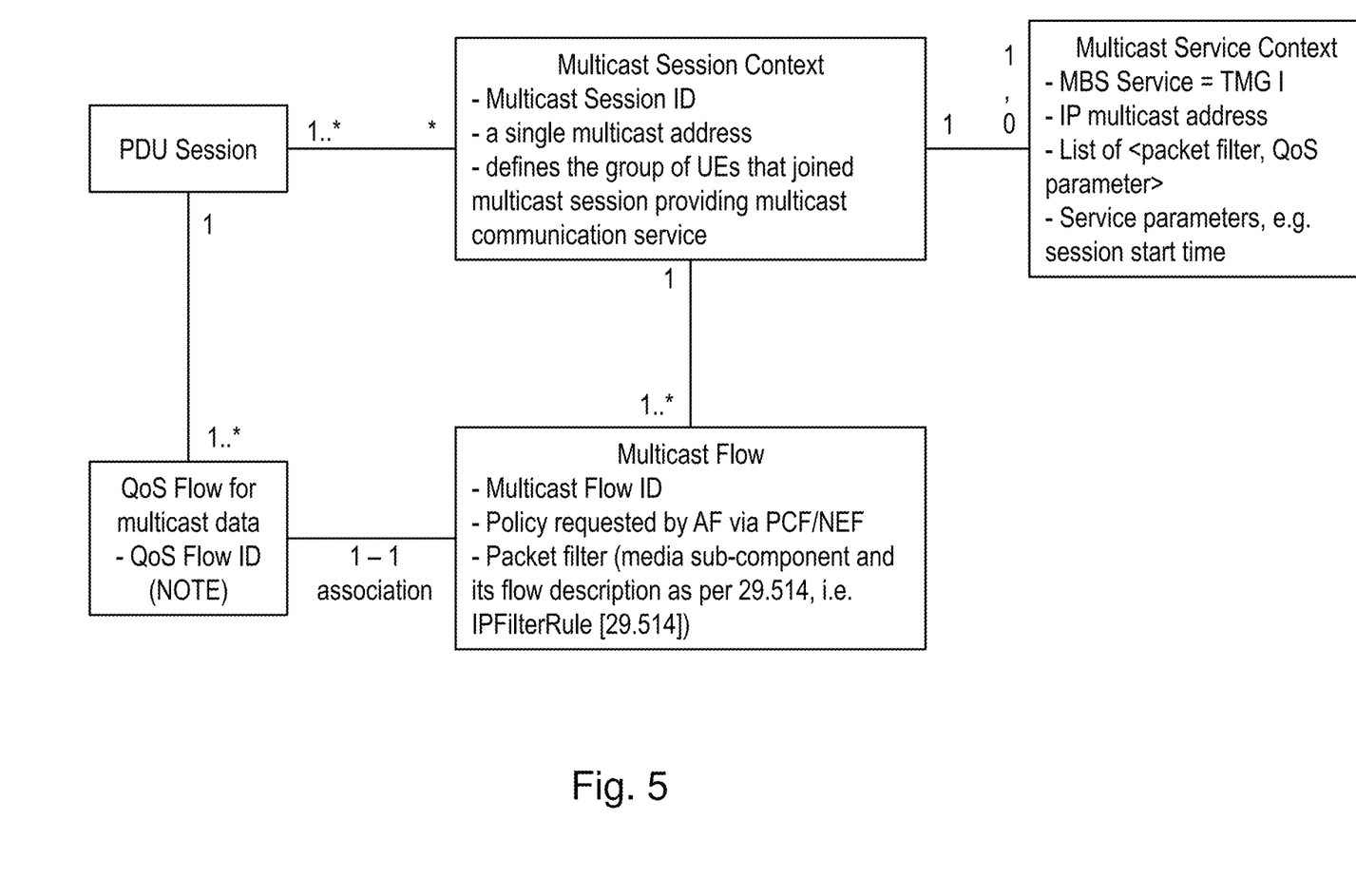
FIG. 5 illustrates block diagram according to an embodiment.

A method according to embodiments herein will now be described from the view of the network node QQ100 together with FIG. 4b.

Example embodiments of a method performed by the network node QQ100 implementing a core network function, will now be described with reference to a flowchart depicted in FIG. 4b. The network node QQ100 may e.g., be any one out of: The MB-SMF 104, AMF 106 or SMF 108. The method comprises the following actions which may be taken in any suitable order.

Action s412. The network node QQ100 transmits to an AMF, e.g. the AMF 106, a session start request message indicating a group ID allocated for a particular MBS session. In some embodiments, the session start request message triggers the AMF to initiate a paging procedure if the AMF is serving a UE that has joined the MBS session and that is in a non-connected state. The group ID may be a group 5G-S-TMSI.

The network node QQ100 may comprise processing circuitry; and a memory. The memory may contain instructions executable by the processing circuitry, whereby the network node QQ100 is configured to perform the above discussed method.

Summary of Various Embodiments

A1. A method 300, see e.g., FIG. 3, performed by a UE 102, the method comprising:
receiving s302 a first message, e.g., a NAS message, comprising a group ID allocated for a particular MBS session, e.g., when the UE 102 joins MBS session the UE 120 sends a "join message", e.g., PDU Session Modification Request to AMF, and the UE 102 then receives the response to the message; and
while camping on RAN node, e.g., RAN node 101, that does not support MBS services and while being in a RRC state other than RRC_CONNECTED, receiving s304, from the RAN node 101, a paging message; and determining s306 whether the paging message comprises the group ID.

A2. The method of embodiment A1, further comprising, prior to receiving the first message, transmitting request to join the MBS session.

A3. The method of embodiment A1, further comprising:
in response to determining that the paging message comprises the group ID, establishing a connection with the RAN node 101, e.g., UE performs the conventional legacy random access procedure and sends to the network a service request comprising the MBS identifier.

A4. The method of embodiment A3, further comprising:
after establishing the connection with the RAN node 101, receiving data for the MBS session via a unicast transmission from the RAN node 101.

A5. A computer program QQ243 comprising instructions QQ244 which when executed by processing circuitry QQ202 of a UE 102, causes the UE 102 to perform the method of any one of embodiments A1-A4.

A6. A carrier containing the computer program of embodiment A5, wherein the carrier is one of an electronic signal, an optical signal, a radio signal, and a computer readable storage medium QQ242.

A7. A UE 102, the UE 102 comprising:
processing circuitry QQ202; and
a memory QQ242, the memory containing instructions QQ244 executable by the processing circuitry, whereby the UE 102 is configured to perform the method of any one the embodiments A1-A4.

A8. A UE 102, wherein the UE 102 is configured to:
receive a first message, e.g., a NAS message, comprising a group ID allocated for the particular MBS session, e.g., when UE 102 joins MBS session UE 102 sends a "join message", e.g., PDU Session Modification Request to AMF, and the UE 102 then receives the response to the message; and
while camping on RAN node, e.g., RAN node 101, that does not support MBS services and while being in a RRC state other than RRC_CONNECTED, receive from the RAN node 101 a paging message; and
determine whether the paging message comprises the group ID.

A9. The UE 102 of embodiment A8, wherein the UE 102 is further configured to perform the method of any one of claims A2-A4.

B1. A method performed by a network node QQ100 implementing a core network function, e.g., MB-SMF 104, AMF 106, SMF 108, the method comprising:
allocating a group ID for a particular MBS session; and
transmitting toward the UE 102 a message comprising the group ID.

B2. The method of embodiment B1, wherein transmitting the message toward the UE 102 comprises transmitting the message to an SMF 108.

B3. The method of embodiment B1 or B2, further comprising:
transmitting to an AMF 106 a session start request message indicating the group ID, e.g., comprising the group ID and/or MBS session ID.

B4. A method performed by a network node QQ100 implementing a core network function, e.g., MB-SMF 104, AMF 106, SMF 108, the method comprising:
 transmitting to an AMF 106 a session start request message indicating a group ID allocated for a particular MBS session.

B5. The method of embodiment B3 or B4, wherein the session start request message triggers the AMF 106 to initiate a paging procedure if the AMF 106 is serving a UE 102 that has joined the MBS session and that is in a non-connected state.

B6. A computer program QQ143 comprising instructions QQ144 which when executed by processing circuitry QQ102 of a network node QQ100, causes the network node QQ100 to perform the method of any one of embodiments B1-B5.

B7. A carrier containing the computer program of embodiment B6, wherein the carrier is one of an electronic signal, an optical signal, a radio signal, and a computer readable storage medium QQ142.

B8. A network node QQ100, the network node QQ100 comprising:
 processing circuitry QQ102; and
 a memory QQ142, the memory containing instructions QQ144 executable by the processing circuitry, whereby the network node QQ100 is configured to perform the method of any one the embodiments B1-B6.

B9. A network node QQ100, wherein the network node is configured to:
 allocate a group ID for a particular MBS session; and
 transmit toward the UE 102 a message comprising the group ID.

B10. A network node QQ100, wherein the network node QQ100 is configured to:
 transmit to an AMF 106 a session start request message indicating a group ID allocated for a particular MBS session.

B11. The network node QQ100 of embodiment B9 or B10, wherein the network node QQ100 is further configured to perform the method of any one of embodiments B2-B5.

CONCLUSION

As demonstrated above, group paging for MBS over non-MBS supporting RAN is introduced. A core network function, e.g., MB-SMF, SMF, etc., such as e.g. the network node QQ100, allocates a group ID, e.g., Group-5G-S-TMSI, for a specific MBS session and this identifier allows grouping of UE that are interested to participate in the specific MBS Session based on knowledge that there is non-homogenous MBS support in RAN and the core network function provides that identifier to relevant UEs, such as e.g. the UE 102, over NAS.

While various embodiments are described herein, an in any appendix, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a user equipment (UE), the method comprising:
 transmitting a request to join a particular multicast-broadcast services (MBS) session, the request comprising an MBS session identifier (ID) identifying the particular MBS session,
 in response to the request, receiving a first message comprising a group ID allocated for the particular MBS session, the group ID being different than the MBS session ID and comprising a group 5G-S-Temporary Mobile Subscriber Identity (5G-S-TMSI) assignable to a plurality of UEs that join the particular MBS session via unicast; and
 while the UE is camping on a radio access network (RAN) node that does not support MBS and is in a radio resource control (RRC) state other than RRC_CONNECTED, receiving from the RAN node a paging message; and
 determining whether the paging message comprises the group ID.

2. The method of claim 1, further comprising in response to determining that the paging message comprises the group ID, establishing a connection with the RAN node.

3. The method of claim 2, further comprising after establishing the connection with the RAN node, receiving data for the MBS session via a unicast transmission from the RAN node.

4. A non-transitory, computer-readable medium storing computer-executable instructions that, when executed by processing circuitry of a user equipment (UE), cause the UE to perform operations corresponding to the method of claim 1.

5. A user equipment (UE) comprising:
 communication interface circuitry configured to communicate with a radio access network (RAN); and
 processing circuitry operably coupled to the communication interface circuitry, wherein the processing circuitry and the communication interface circuitry are configured to:
  transmit a request to join a particular multicast-broadcast services (MBS) session, wherein the request includes an MBS session identifier (ID) identifying the particular MBS session;
  in response to the request, receive a first message comprising a group ID allocated for the particular MBS session, wherein the group ID is different than the MBS session ID and comprises a group 5G-S-Temporary Mobile Subscriber Identity (5G-S-TMSI) assignable to a plurality of UEs that join the particular MBS session via unicast; and
  while the UE is camping on a radio access network (RAN) node that does not support MBS and is in a radio resource control (RRC) state other than RRC_CONNECTED, receive from the RAN node a paging message; and
  determine whether the paging message comprises the group ID.

6. The UE of claim 5, wherein the processing circuitry and the communication interface circuitry are further configured to establish a connection with the RAN node in response to determining that the paging message comprises the group ID.

7. The UE of claim 6, wherein the processing circuitry and the communication interface circuitry are further configured to, after establishing the connection with the RAN node, receive data for the MBS session via a unicast transmission from the RAN node.

8. A method performed by a network node configured to implement a core network function, the method comprising:
receiving a request for a user equipment (UE) to join a particular multicast-broadcast services (MBS) session, wherein the request includes an MBS session identifier (ID) identifying the particular MBS session;
allocating a group ID for the particular MBS session, the group ID being different than the MBS session ID and comprising a group 5G-S-Temporary Mobile Subscriber Identity (5G-S-TMSI) assignable to a plurality of UEs that join the particular MBS session via unicast; and
transmitting, towards the UE, a message that includes the group ID.

9. The method of claim 8, wherein the message is transmitted to a session management function (SMF) of the core network.

10. The method of claim 8, further comprising transmitting, to an access and mobility management function (AMF) of the core network, a session start request message indicating the group ID.

11. The method of claim 10, wherein the session start request message triggers the AMF to initiate a paging procedure for the UE when the following conditions are present: the AMF is serving the UE, the UE has joined the MBS session, and the UE is in a radio resource control (RRC) state other than RRC_CONNECTED.

12. A non-transitory, computer-readable medium storing computer-executable instructions that, when executed by processing circuitry of a network node configured to implement a core network function, cause the network node to perform operations corresponding to the method of claim 8.

13. A network node configured to implement a core network function, wherein the network node comprises:
communication interface circuitry configured to communicate with other core network functions; and
processing circuitry operably coupled to the communication interface circuitry, wherein the processing circuitry and the communication interface circuitry are configured to:
receive a request for a user equipment (UE) to join a particular multicast-broadcast services (MBS) session, wherein the request includes an MBS session identifier (ID) identifying the particular MBS session;
allocate a group ID for the particular MBS session, the group ID being different than the MBS session ID and comprising a group 5G-S-Temporary Mobile Subscriber Identity (5G-S-TMSI) assignable to a plurality of UEs that join the particular MBS session via unicast; and
transmit, towards the UE, a message that includes the group ID.

14. The network node of claim 13, wherein the message is transmitted to a session management function (SMF) of the core network.

15. The network node of claim 13, wherein the processing circuitry and the communication interface circuitry are further configured to transmit, to an access and mobility management function (AMF) of the core network, a session start request message indicating the group ID.

16. The network node of claim 15, wherein the session start request message triggers the AMF to initiate a paging procedure for the UE when the following conditions are present: the AMF is serving the UE, the UE has joined the MBS session, and the UE is in a radio resource control (RRC) state other than RRC_CONNECTED.

* * * * *